(12) United States Patent
Choi et al.

(10) Patent No.: US 8,621,577 B2
(45) Date of Patent: Dec. 31, 2013

(54) METHOD FOR PERFORMING MULTIPLE PRE-SHARED KEY BASED AUTHENTICATION AT ONCE AND SYSTEM FOR EXECUTING THE METHOD

(75) Inventors: Jin-Hyeock Choi, Suwon-si (KR); Emin Yegin Alper, Foster City, CA (US); Jun-Hyuk Song, Suwon-si (KR); Ji-Cheol Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 983 days.

(21) Appl. No.: 11/501,927

(22) Filed: Aug. 10, 2006

(65) Prior Publication Data
US 2007/0043945 A1 Feb. 22, 2007

Related U.S. Application Data

(60) Provisional application No. 60/709,463, filed on Aug. 19, 2005.

(30) Foreign Application Priority Data

May 29, 2006 (KR) .................. 10-2006-0048238

(51) Int. Cl.
*G06F 21/00* (2013.01)
(52) U.S. Cl.
USPC .............. 726/5; 713/158; 713/161; 713/170; 380/201; 380/270; 380/255; 455/411
(58) Field of Classification Search
USPC ............................................. 726/5
See application file for complete search history.

(56) References Cited

U.S. PATENT DOCUMENTS

| | | | | |
|---|---|---|---|---|
| 4,529,870 A * | 7/1985 | Chaum | .................. | 235/380 |
| 6,633,979 B1 | 10/2003 | Smeets | | |
| 7,010,692 B2 * | 3/2006 | Jablon | .................. | 713/171 |
| 7,233,997 B1 * | 6/2007 | Leveridge et al. | .......... | 709/229 |
| 7,305,706 B2 * | 12/2007 | Moon et al. | .................. | 726/15 |
| 7,577,834 B1 * | 8/2009 | Traversat et al. | .......... | 713/156 |
| 7,581,100 B2 * | 8/2009 | Mizrah | .................. | 713/171 |
| 7,813,822 B1 * | 10/2010 | Hoffberg | .................. | 700/94 |
| 7,895,648 B1 * | 2/2011 | Nandy et al. | .................. | 726/14 |
| 2001/0002486 A1 | 5/2001 | Kocher et al. | | |

(Continued)

FOREIGN PATENT DOCUMENTS

| | | | |
|---|---|---|---|
| CA | 02356420 | * | 8/2001 |
| JP | 2003-150553 | | 5/2003 |

(Continued)

OTHER PUBLICATIONS

Security architecture in a multi-hop mesh network|http://citeseerx.ist.psu.edu/viewdoc/download?doi=10.1.1.74.2949&rep=rep1&type=pdf|Cheikhrouhou et al.|2006|pp. 1-10.*

(Continued)

*Primary Examiner* — Mahfuzur Rahman
(74) *Attorney, Agent, or Firm* — NSIP Law (57) ABSTRACT

A method and apparatus for performing a multiple Pre-Shared Key (PSK) based authentication in a single procedure is described, where the multiple PSK based authentication generates a combined credential in a terminal by using a plurality of credentials including a user identifier and the PSK, and authenticates the terminal in an authentication server by using the combined credential.

23 Claims, 8 Drawing Sheets

(56) References Cited

U.S. PATENT DOCUMENTS

| | | | |
|---|---|---|---|
| 2001/0009025 A1* | 7/2001 | Ahonen | 713/161 |
| 2003/0229789 A1* | 12/2003 | Morais et al. | 713/171 |
| 2004/0098350 A1* | 5/2004 | Labrou et al. | 705/64 |
| 2004/0123159 A1* | 6/2004 | Kerstens et al. | 713/202 |
| 2004/0198054 A1 | 10/2004 | Boukherroub et al. | |
| 2004/0213237 A1* | 10/2004 | Yasue et al. | 370/392 |
| 2004/0223619 A1 | 11/2004 | Jablon | |
| 2005/0273843 A1* | 12/2005 | Shigeeda | 726/5 |
| 2005/0278778 A1* | 12/2005 | D'Agostino et al. | 726/5 |
| 2006/0018481 A1* | 1/2006 | Nagano et al. | 380/270 |
| 2006/0048212 A1* | 3/2006 | Tsuruoka et al. | 726/4 |
| 2006/0075224 A1* | 4/2006 | Tao | 713/164 |
| 2007/0174614 A1* | 7/2007 | Duane et al. | 713/168 |
| 2007/0185994 A1* | 8/2007 | Lalonde | 709/225 |
| 2008/0232382 A1* | 9/2008 | Iwama et al. | 370/401 |

FOREIGN PATENT DOCUMENTS

| | | |
|---|---|---|
| JP | 2003-324429 A | 11/2003 |
| JP | 2004-246895 | 9/2004 |
| JP | 2004-282295 | 10/2004 |
| KR | 10-2001-0076763 | 8/2001 |
| KR | 10-2003-0075224 | 9/2003 |
| KR | 10-2004-0088137 | 10/2004 |
| KR | 10-2004-0107309 | 12/2004 |
| WO | WO 03/019856 | 3/2003 |

OTHER PUBLICATIONS

Kenji Imamoto et al.. "A Design of Diffie-Hellman Based Key Exchange Using One-Time ID in Pre-Shared Key Model", Advanced Information Networking and Applications, 2004, AINA 2004, 18th International Conference on vol. 1, 2004, pp. 327-332, vol. 1.

Dario Tonesi et al., "Smart PSK Provisioning: A Key-Management and Authentication Scheme for Wireless LANs", Computer Communications and Networks, 2005, ICCCN 2005, Processings, 14th International Conferences on Oct. 17-19, 2005, pp. 119-124.

Chinese Office Action issued on Aug. 11, 2010, in corresponding Chinese Patent Application No. 200680030186.9 (4 pages).

Japanese Office Action issued on Mar. 1, 2011, in corresponding Japanese Application No. 2008-526868 (2 pages).

Office Action issued on Dec. 20, 2011, in corresponding Japanese Patent Application No. 2008-526868 2890.

Japanese Office Action issued Mar. 12, 2013 in counterpart Japanese Patent Application No. 2011-123674 ( 2 pages, in Japanese).

* cited by examiner

METHOD FOR PERFORMING MULTIPLE PRE-SHARED KEY BASED AUTHENTICATION AT ONCE AND SYSTEM FOR EXECUTING THE METHOD

CROSS-REFERENCE TO RELATED APPLICATIONS

This application claims the benefit under 35 U.S.C. §119 (e) of an U.S. Provisional Application No. 60/709,463, filed on Aug. 19, 2005, in the U.S. Patent and Trademark Office, and under 35 U.S.C. §119(a) of a Korean Patent Application No. 10-2006-0048238, filed on May 29, 2006, in the Korean Intellectual Property Office, the entire disclosure of both of which are hereby incorporated by reference.

BACKGROUND OF THE INVENTION

1. Field of the Invention

The present invention relates to a method of performing a multiple Pre-Shared key (PSK) based authentication in a single procedure and a system for performing the method. More particularly, the present invention relates to a method of combining a user identifier and the PSK in a terminal, and authenticating the terminal in an authentication server by using the combined user identifier and the PSK, and a system for performing the method.

2. Description of Related Art

An authentication system indicates a system which can verify whether a user who accesses a computer via a network is a registered user or an authorized user, by using a secure method. The authentication system is particularly important to an open network. In this instance, a key portion of the authentication system is software referred to as an authentication server which is in charge of the user's name, password, and the like. The authentication server verifies that the user is an authorized user himself/herself by using an authentication protocol which is encrypted with respect to a service program. An example of the authentication system may comprise an authentication service of a Xerox Network System (XNS) which is a Protocol system of American Xerox Corporation. Such an authentication system was not included in UNIX, until Kerberos was developed based on the Athena Project at Massachusetts Institute of Technology (MIT).

Each time an authentication process of the authentication system is performed, the authentication process incurs a certain latency. As an example, a challenge handshake authentication protocol (CHAP), which encrypts a simple password and transmits the encrypted password, requires one round-trip between a mobile device and a home domain. Through this, the latency for the one round-trip is incurred for each authentication.

Figure 1:
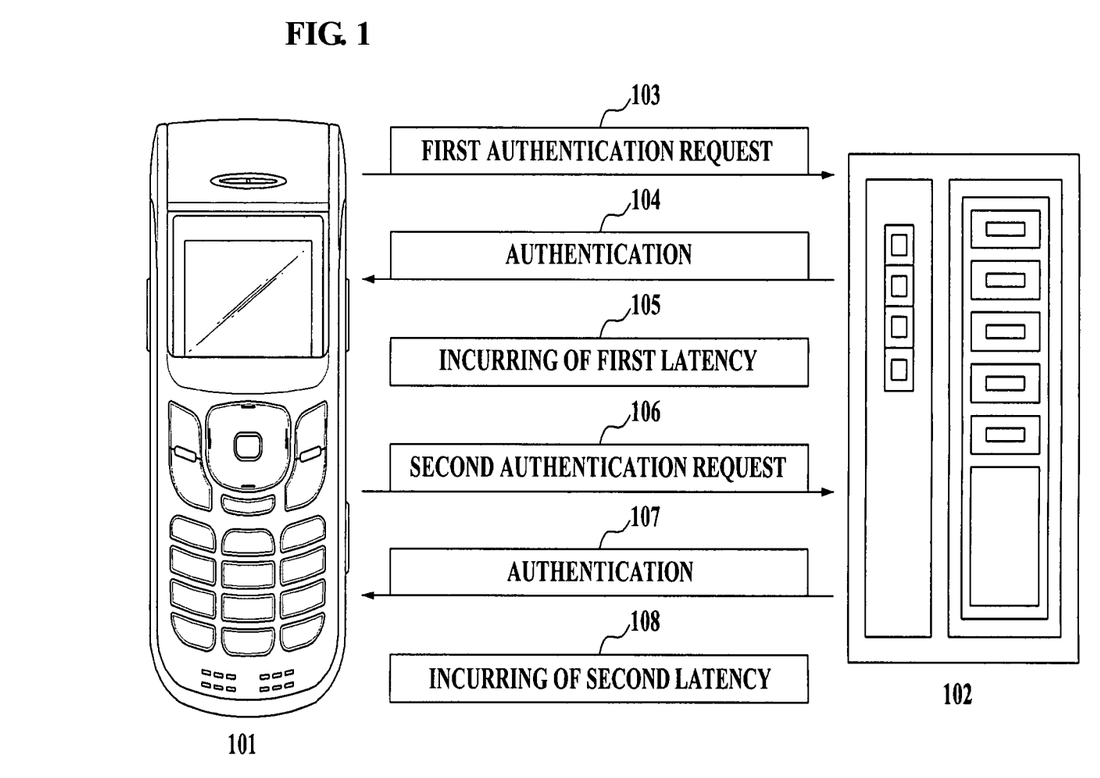
FIG. 1 is a diagram illustrating a latency for two authentications according to a conventional art.

FIG. 1 is a diagram illustrating a latency for two authentications according to a conventional art. In particularly, in FIG. 1, the diagram illustrates an authentication request and an authentication process between a mobile device 101 and an authentication server 102, and the latency which is incurred by the process.

Referring to FIG. 1, in step 103, the mobile device 101 requests the authentication server 102 for a first authentication. A first latency is incurred in step 105 until an authentication according to the request is performed in step 104. After the authentication, the mobile device 101 requests the authentication server 102 for a second authentication in step 106. A second latency is incurred in step 108 until an authentication according to the request is performed in step 107.

As described above, when a mobile device requires at least two authentications, for example, a device authentication and a subscription authentication respectively, a double network login latency is incurred. The incurred latency is an issue for achieving seamless handovers of a wireless terminal.

Specifically, in the authentication method according to the conventional art, a plurality of independent authentications, which are required to be transmitted before a wireless terminal accesses a desired service, incur a latency which is generated by multiplying the latency for each authentication and a number of the authentications. Accordingly, handovers are not generated regularly when communicating with a base station.

Accordingly, there is a need for an improved apparatus and method for performing authentication in a single procedure, at least to reduce the latency.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method of performing a multiple Pre-Shared key (PSK) based authentication in a single procedure and a system for performing the method.

An aspect of exemplary embodiments of the present invention also provides a PSK-based authentication method which can process a plurality of authentications via a single procedure and thereby, reduce a latency for an access to a service to the latency for one authentication.

An aspect of exemplary embodiments of the present invention also provides a PSK-based authentication method which can utilize an existing authentication protocol while not utilizing a new authentication protocol for the latency.

According to an aspect of exemplary embodiments of the present invention, a method of performing a multiple PSK-based authentication using a single process is provided. The method comprises generating a combined credential in a terminal by using a plurality of credentials including a user identifier and the PSK, and authenticating the terminal in an authentication server by using the combined credential.

According to another aspect of exemplary embodiments of the present invention, the generating of the combined credential comprises generating a combined user identifier by consecutively combining the user identifier, generating a combined PSK by consecutively combining the PSK, and generating the combined credential including the combined user identifier and the combined PSK.

According to still another aspect of exemplary embodiments of the present invention, the combined user identifier and the combined PSK comprise the user identifier and the PSK included in the credential, respectively in an identical order.

According to yet another aspect of exemplary embodiments of the present invention, the generating of the PSK is performed when an authentication process of the authentication server has accessed all of PSKs.

According to further another embodiment of exemplary embodiments of the present invention, a method of performing a PSK-based authentication in a terminal is provided. The method comprises receiving a predetermined challenge code from an authentication server, generating a response code, based on the challenge code and an N number of PSKs, and transmitting the response code to the authentication server.

According to another aspect of exemplary embodiments of the present invention, a method of performing a PSK-based authentication in an authentication server is provided. The method comprises transmitting a predetermined challenge code to a terminal, generating a first response code, based on the challenge code and an N number of PSKs, receiving a second response code from the terminal, comparing the first response code and the second response code, and authenticating the terminal when the first response code is identical to the second response code.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A terminal as used in the present specification comprises mobile communication devices, such as a Personal Digital Cellular (PDC) phone, a personal communication service (PCS) phone, a personal handyphone system (PHS) phone, a Code Division Multiple Access (CDMA)-2000 (1X, 3X) phone, a Wideband CDMA phone, a dual band/dual mode phone, a Global System for Mobile Communications (GSM) phone, a mobile broadband system (MBS) phone, a Digital Multimedia Broadcasting (DMB) phone, a smart phone, and a cellular phone, portable terminals such as a personal digital assistant (PDA), a hand-held PC, a notebook PC, a laptop computer, a wireless broadband Internet (WiBro) terminal, and an MP3 player; and all types of hand-held based wireless communication devices including an International Mobile Telecommunication (IMT)-2000 providing international roaming service and extended mobile communication service. Also, the terminal may comprise a predetermined communication module such as a CDMA module, a Bluetooth module, an Infrared Data Association (IrDA) module, a wired/wireless LAN card, and a wireless communication device which is provided with a global positioning system (GPS) chip enabling tracking of a position via a GPS. Also, the terminal may comprise a microprocessor which can play multimedia and perform a certain calculation operation.

Also, "authenticating a terminal" or "performing an authentication of a terminal" referred to herein is substantially identical to authenticating a plurality of user identifiers which are required to be authenticated via the terminal.

Hereinafter, embodiments of the present invention will be described with reference to the accompanying drawings.

Figure 2:
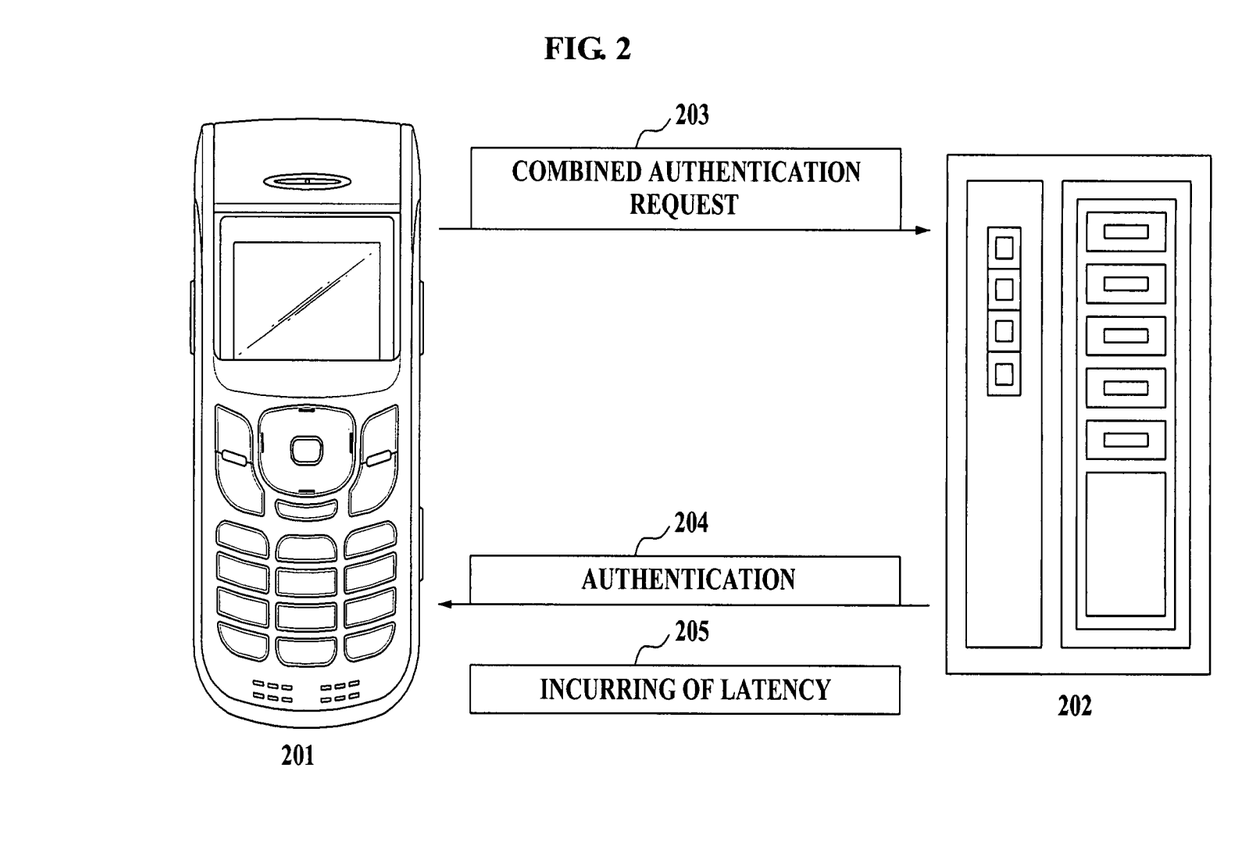
FIG. 2 is a diagram illustrating a latency for a plurality of authentications according to an exemplary embodiment of the present invention.

FIG. 2 is a diagram explaining a latency for a plurality of authentications according to an exemplary embodiment of the present invention. FIG. 2 illustrates an authentication request and an authentication process between a mobile device 201 and an authentication server 202, and the latency which is incurred by the process.

Referring to FIG. 2, in step 203, the mobile device 201 generates a combined user identifier and a combined Pre-Shared Key (PSK) by combining a plurality of user identifiers and PSKs, which are required for the plurality of authentications, transmits the combined user identifier and the combined PSK to the authentication server 202, and requests the authentication server 202 for the plurality of authentications. Specifically, the request for the plurality of authentications may be performed during a single requesting procedure.

In step 204, the authentication server 202 authenticates the mobile device 201 via the single procedure, in response to the request for the plurality of authentications. Accordingly, in step 205, a latency that is the same as the latency for only one authentication is incurred.

Hereinafter, a method of combining the user identifier and the PSK will be described in detail with reference to FIG. 3.

Figure 3:
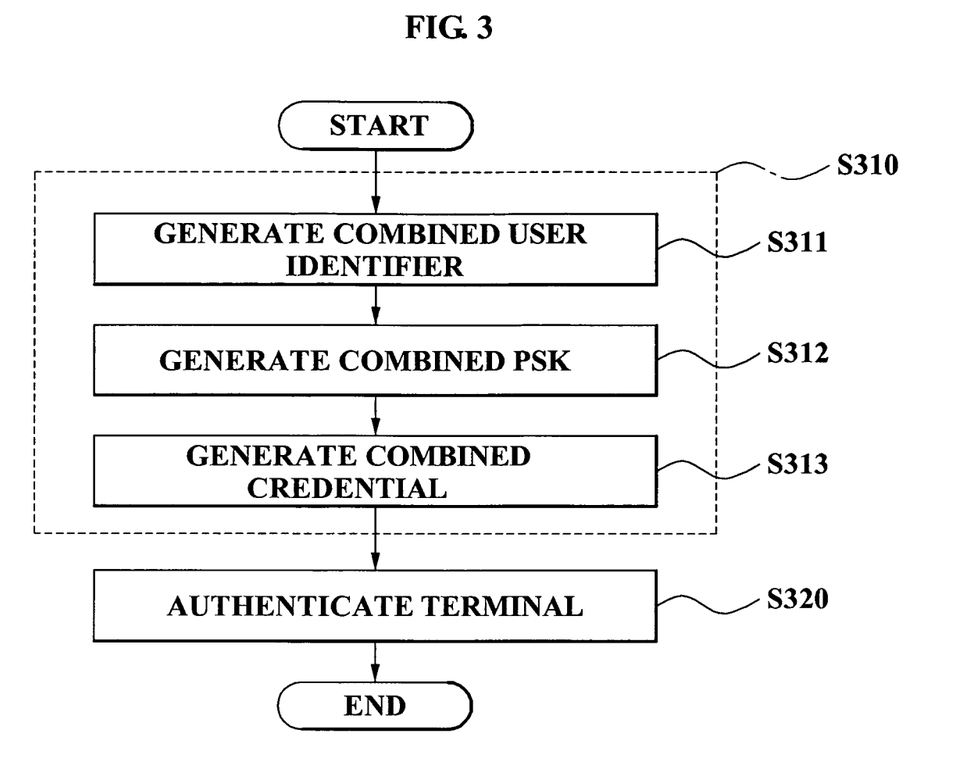
FIG. 3 is a flowchart illustrating a method of performing a multiple PSK-based authentication via a single procedure according to an exemplary embodiment of the present invention.

FIG. 3 is a flowchart illustrating a method of performing a multiple PSK-based authentication via a single procedure according to an exemplary embodiment of the present invention.

In step S310, a PKS based authentication system generates a combined credential in a terminal by using a plurality of credentials which comprise a user identifier and the PSK.

In this instance, the PSK or a shared secret is a character string of a Virtual Private Network (VPN) service, and is obtained prior to other credentials, e.g. a user name and a password. In Windows XP, the PSK is referred to as a PSK for authentication, but is well-know as a shared secret in general operating systems.

When a connection to a VPN server is generated, the VPN server may not allow an authentication process until the character string is correctly assigned. When the VPN server does not receive the PSK, the user name and the password may not be transmitted, and the connection to the VPN server is also terminated. Although the PSK is not well-known to many users, the PSK may be considered as a type of password.

The PSK-based authentication system may construct the plurality of credentials C including the user identifier U and the PSK K, represented as Equation 1 below.

$$C1=\{U1,K1\}; C2=\{U2,K2\},\ldots,Cn=\{Un,Kn\} \quad \text{[Equation 1]}$$

A method of generating the combined credential by using the plurality of credentials as shown in Equation 1 will be described in detail with reference to steps S311 through S313.

In step S311, the PSK-based authentication system generates a combined user identifier by consecutively combining the user identifiers. In this instance, the combined user identifier may identify the user identifier based on a predetermined discriminator which comprises '|', '/' and ','.

In this case, the combined user identifier Uc may be represented as Equation 2 below.

$$Uc=U1|","|U2|","|\ldots|Un \quad \text{[Equation 2]}$$

As described above, the combined user identifier may be generated in a single character string by arranging and identifying the user identifier in a consecutive character string via the discriminator. As an example, two user identifiers joe.smith@ISP1.com and 00:0D:56:DD:C4:49 may be combined so that the combined user identifier may be generated as the single character string, joe.smith@ISP1.com, 00:0D:56: DD:C4:49, using ',' as the discriminator.

In step S312, the PSK-based authentication system generates a combined PSK by consecutively combining the PSKs. Step S312 may be performed when an authentication process of the authentication server has accessed all PSKs.

In this case, the combined PSK Kc may be represented as Equation 3 below.

$$Kc=K1|K2|\ldots Kn \quad \text{[Equation 3]}$$

As described above, the combined PSK may be generated into a single greater character string by respectively connecting the PSKs which constitute the single character string.

In this case, in steps S311 and S312, the combined user identifier and the combined PSK may comprise the user identifier and the PSK included in the credential, respectively, in an identical order.

In step S313, the PSK-based authentication system generates the combined credential which comprises the combined user identifier and the combined PSK.

In this case, the combined credential cC may be represented as Equation 4 below.

$$cC=\{Uc,Kc\} \quad \text{[Equation 4]}$$

As described above, the combined credential cC may indicate a group which comprises the above two character strings, for example, the combined user identifier Uc and the combined PSK Kc, as elements.

In step S320, the PSK-based authentication system performs an authentication of the terminal in the authentication server by using the combined credential.

Specifically, the authentication server performs the PSK-based authentication by using the combined credential, and a successful authentication of the combined credential implicitly authenticates each of the plurality of credentials, C1, C2, . . . , Cn.

As described above, a latency for an access to a service may be reduced to the latency for one authentication by processing a plurality of authentications via a single procedure. Also, the latency for the plurality of authentications may be reduced to the latency for one authentication via an authentication method which can utilize an existing authentication protocol, not a new authentication protocol for the latency.

However, sometimes the single authentication process may not access all of the keys. As an example, a subscription key and a device key may be stored in separate hardware units. In this case, a generation of a keyed hash which is required by an authentication method must be performed iteratively, which ensures that PSKs are not required to be shared across security domains, while still producing a proof of possession of all the PSKs.

The method will be described in detail with reference to FIGS. 4 and 5.

Figure 4:
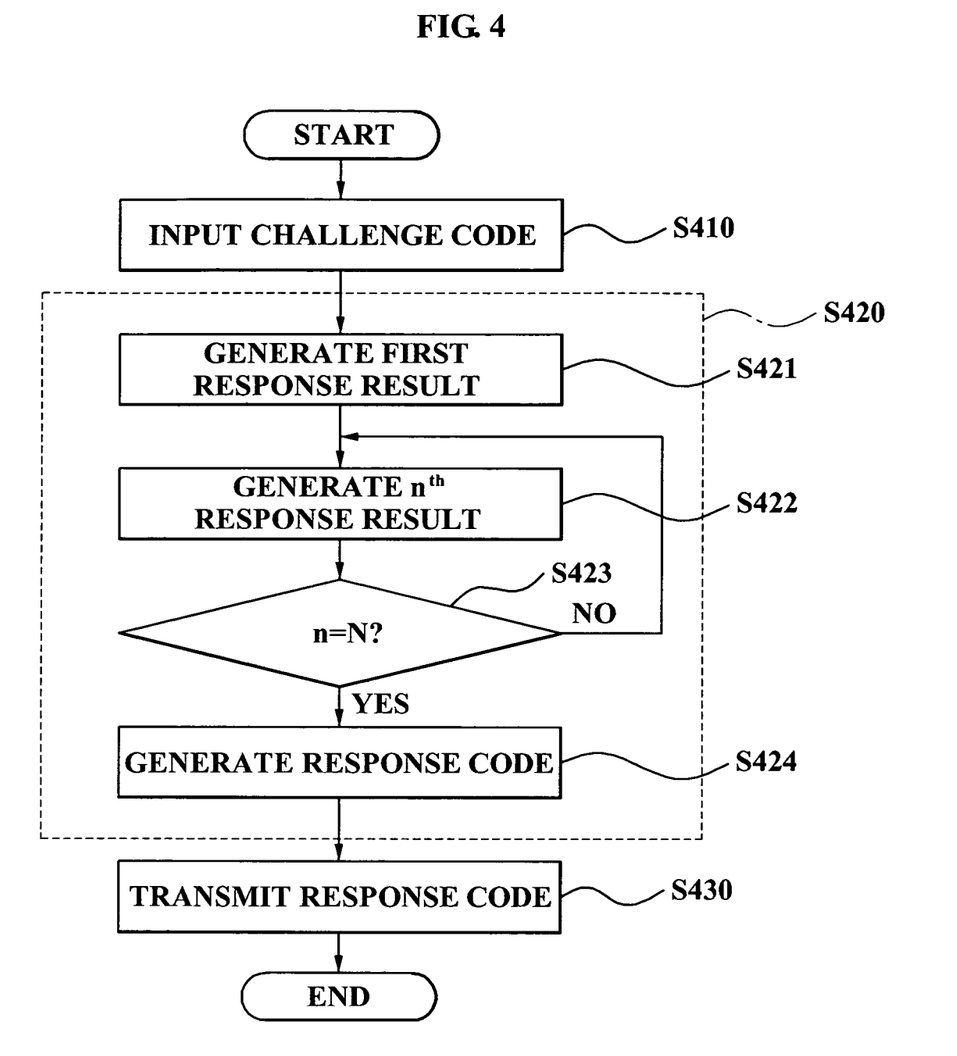
FIG. 4 is a flowchart illustrating a method of performing a PSK-based authentication in a terminal according to another exemplary embodiment of the present invention.

FIG. 4 is a flowchart illustrating a method of performing a PSK-based authentication in a terminal according to another exemplary embodiment of the present invention.

In step S410, the terminal receives a predetermined challenge code from an authentication server.

In step S420, the terminal generates a response code, based on the challenge code and an N number of PSKs.

In step S421, the terminal converts the challenge code and a first PSK of a first user identifier via a predetermined conversion method, and generates a first response result. In this case, the conversion method may comprise a predetermined hash function.

The process of generating the first response result R1 via the challenge code ch and the first PSK K1 may be represented as Equation 5 below.

$$R1=\text{hash}(ch,K1) \quad \text{[Equation 5]}$$

In step S422, the terminal converts an $n-1^{th}$ response result and an $n^{th}$ PSK of an $n^{th}$ user identifier via the conversion method, and generates an $n^{th}$ response result.

The $n^{th}$ response result Rn may be represented as Equation 6 below.

$$Rn=\text{hash}(Rn-1,Kn) \quad \text{[Equation 6]}$$

In step S423, depending upon a comparison result of n and N, the terminal performs step S424 when the n is equal to the N, and performs step S422 when the n is not equal to the N. In this case, the n comprises numbers between 2 and N. Step S423 indicates repeating step S422 with respect to each of the numbers included in the n.

In step S424, the terminal generates the $n^{th}$ response result as the response code, in which the n is identical to the N.

In step S430, the terminal transmits the response code to the authentication server.

Figure 5:
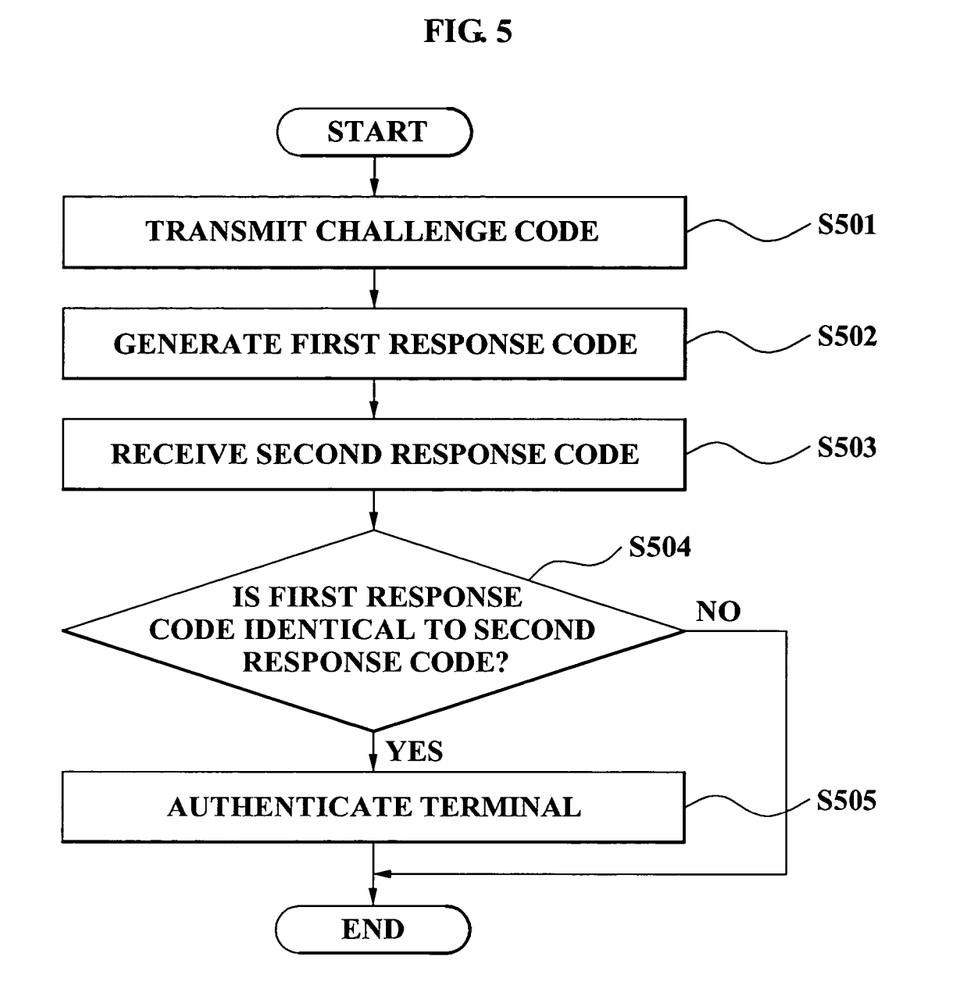
FIG. 5 is a flowchart illustrating a method of performing a PSK-based authentication in an authentication server according to still another exemplary embodiment of the present invention.

FIG. 5 is a flowchart illustrating a method of performing a PSK-based authentication in an authentication server according to still another exemplary embodiment of the present invention.

In step S501, the authentication server transmits a predetermined challenge code to a terminal.

In step S502, the authentication server generates a first response code, based on the challenge code and an N number of PSKs.

In this case, as described with reference to steps S421 through S424, step S502 may comprise converting the challenge code and a first PSK of a first user identifier via a predetermined conversion method and generating a first response result; converting an $n-1^{th}$ response result and an $n^{th}$ PSK of an $n^{th}$ user identifier via the conversion method, and generating an $n^{th}$ response result; and generating the $n^{th}$ response result as the first response code, when the n is identical to the N. Also, step S502 may further comprise repeating the converting an $n-1^{th}$ response result and an $n^{th}$ PSK of an $n^{th}$ user identifier via the conversion method, and the generating an $n^{th}$ response result, with respect to each of the numbers included in the n.

Also, the conversion method may comprise a predetermined hash function.

In step S503, the authentication server receives a second response code from the terminal.

In step S504, the authentication server compares the first response code and the second response code, and performs step S505 when the first response code is identical to the second response code. Also, when not identical, the authentication server terminates the connection.

In step S505, the authentication server authenticates the terminal when the first response code is identical to the second response code.

Specifically, the authentication server maintains PSKs which are identical to the plurality of PSKs stored in the terminal as described with FIG. 4. Accordingly, a response code is pre-generated via the method described in FIG. 4, and when the generated response code is identical to the transmitted response code from the terminal, the authentication server authenticates the terminal.

Figure 6:
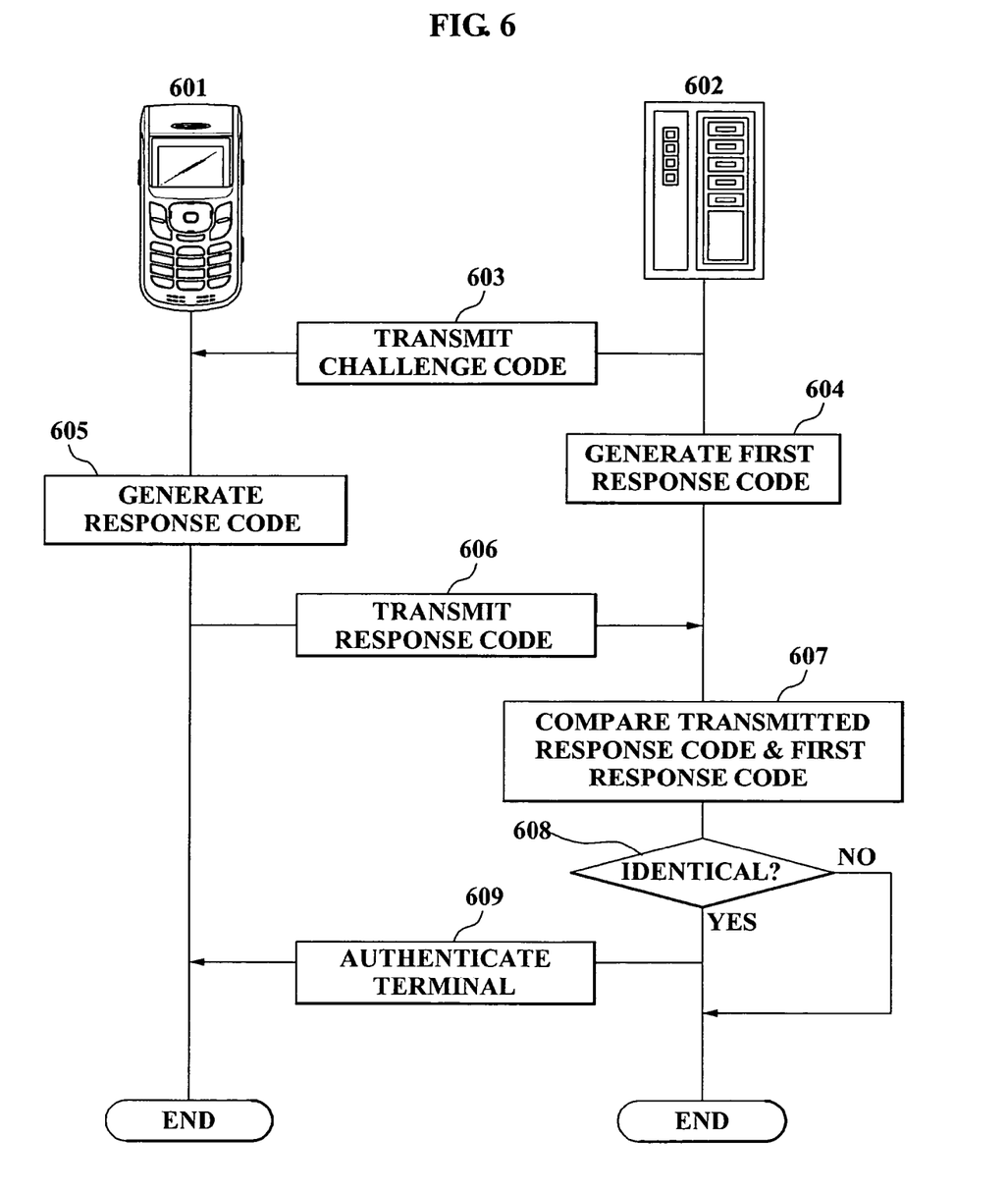
FIG. 6 is a flowchart illustrating a method of performing a PSK-based authentication between a terminal performing a PSK-based authentication, and an authentication server according to an exemplary embodiment of the present invention.

FIG. 6 is a flowchart illustrating a method of performing a PSK-based authentication between a terminal performing a PSK-based authentication, and an authentication server according to an exemplary embodiment of the present invention.

In step 603, a challenge code is transmitted from an authentication server 602. In step 605, a terminal 601 generates a response code using the transmitted challenge code and a PSK which is stored in the terminal 601. Also, before this, in step 604, the authentication server 602 generates a first response code using the PSK. In this instance, the PSK is identical to the PSK stored in the authentication server 602.

In step 606, the terminal 601 transmits the response code to the authentication server 602. In step 607, the authentication server 602 compares the transmitted response code and the first response code. When the transmitted response code is identical to the first response code in step 608, the authentication server 602 authenticates the terminal 601 in step 609.

In this instance, when the authentication method requires a Key-Derivation Key (KDK), the KDK may be calculated by Equation 7 below.

$$KDKc = KDF(KDK1, KDK2|KDK3|\ldots KDKn) \quad \text{[Equation 7]}$$

In this instance, an appropriate KDF needs to be selected. As an example, the KDF may be represented as Equation 8 below.

$$M\_AES\text{-}CTR(K1,K2|K3|\ldots Kn|\text{"Combined KDK"}, ctr\_iv=1) \quad \text{[Equation 8]}$$

The KDF is a cryptographic hash function which is designed to secure a key or a password.

Figure 7:
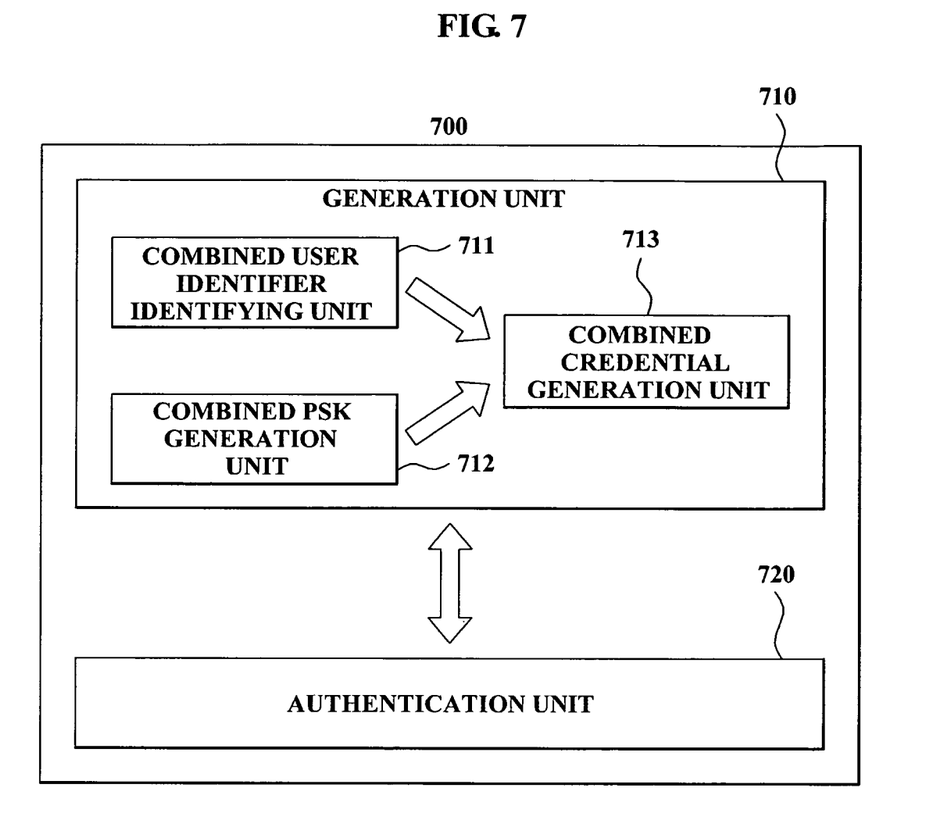
FIG. 7 is a block diagram illustrating an internal configuration of a system for performing a multiple PSK-based authentication via a single procedure according to yet another exemplary embodiment of the present invention.

FIG. 7 is a block diagram illustrating an internal configuration of a system for performing a multiple PSK-based authentication via a single procedure according to yet another exemplary embodiment of the present invention. As shown in FIG. 7, a PSK-based authentication system 700 may comprise a generation unit 710 and an authentication unit 720.

The generation unit 710 may indicate a terminal for requesting an authentication. The authentication unit 720 may indicate an authenticate server for authenticating the terminal. Accordingly, data input/output devices for performing the authentication are not illustrated or described.

The generation unit 710 generates a combined credential in a terminal by using a plurality of credentials which comprises user identifiers and the PSKs. In this case, the generation unit 710 may comprise a combined user identifier identifying unit 711, a combined PSK generation unit 712, and a combined credential generation unit 713.

The combined user identifier generation unit 711 generates a combined user identifier by consecutively combining the user identifier. The combined PSK generation unit 712 generates a combined PSK by consecutively combining the PSKs. In this case, the combined PSK generation unit 712 may perform an operation of generation of a combined PSK when an authentication process of the authentication server has accessed all of the PSKs.

The combined credential generation unit 713 generates the combined credential which comprises the combined user identifier and the combined PSK. Since the plurality of user identifiers are authenticated using the combined credential, a plurality of credentials may be authenticated with the same latency as the latency incurred by one authentication.

The authentication unit 720 performs the authentication of the terminal in the authentication server, using the combined credential.

As described above, a latency for an access to a service may be reduced to the latency for one authentication by processing a plurality of authentications via a single procedure. Also, the latency for the plurality of authentications may be reduced to the latency for one authentication via an authentication method which can utilize an existing authentication protocol, not a new authentication protocol for the latency.

As an example, PSK-based device and subscription authentications are expected to be a commonplace in WiMAX networks. In this instance, WiMAX is a technology that Intel Corporation is developing for a portable Internet technology standard. Also, WiMAX complements existing wireless LAN 802.11a/b/g to widely extend the use of the Internet to the outdoors, but does not secure handoffs between moving base stations.

Following an initial provisioning, a WiMAX terminal will be required to execute both the device authentication and the subscription authentication in an identical authentication server.

As described above, when applying certain exemplary embodiments of the present invention to WiMAX, a login latency for the WiMAX network may be reduced to a half.

Also, handovers of a mobile terminal may be smoothed using WiMAX. In this instance, the handover indicates that a mobile terminal automatically follows a new communication channel of a neighboring base station and continuously maintains a communication state, when the mobile terminal leaves a corresponding mobile base service cell boundary to a neighboring base station service area.

In this case, while the communication channel is automatically changed, a call interruption time is less than approximately 15 ms. Since a digital message exchange between the base station and the terminal is performed for such a short time, a subscriber which is making a call may not sense the call interruption state.

However, when the latency is prolonged, the call interruption time may also be increased. Accordingly, the subscriber may endure a great inconvenience.

As described above, according to exemplary embodiments of the present invention, the aforementioned problems may be addressed by reducing the latency.

Figure 8:
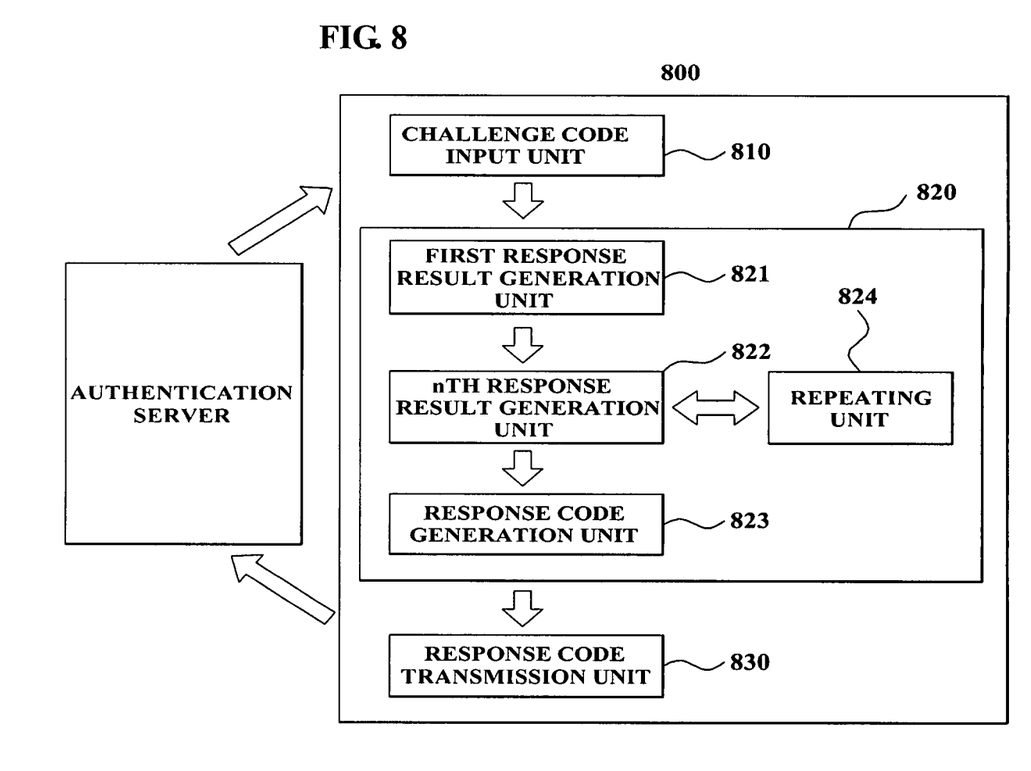
FIG. 8 is a block diagram illustrating an internal configuration of a terminal for performing a PSK-based authentication according to another exemplary embodiment of the present invention.

FIG. 8 is a block diagram illustrating an internal configuration of a terminal 800 for performing a PSK-based authentication according to an exemplary embodiment of the present invention. As shown in FIG. 8, the terminal 800 may comprise a challenge code input unit 810, a generation unit 820, and a response code transmission unit 830.

The challenge code input unit 810 receives a predetermined challenge code from an authentication server. A value of the challenge code may be predetermined by the authentication server.

The generation unit 820 generates a response code, based on the challenge code and an N number of PSKs. In this case, the generation unit 820 may comprise a first response result generation unit 821, an $n^{th}$ response result generation unit 822, a response code generation unit 823, and a repeating unit 824.

The first response result generation unit 821 converts the challenge code and a first PSK of a first user identifier via a predetermined conversion method, and generates a first response result.

The $n^{th}$ response result generation unit 822 converts an $n-1^{th}$ response result and an $n^{th}$ PSK of an $n^{th}$ user identifier via the conversion method, and generates an $n^{th}$ response result.

The response code generation unit 823 generates the $n^{th}$ response result as the response code, when the n is identical to the N.

The method of generating the response code may be performed by an identical method to the method of generating the response code which has been described in FIG. 4.

The repeating unit 824 repeats the converting an $n-1^{th}$ response result and an $n^{th}$ PSK of an $n^{th}$ user identifier via the conversion method, and the generating an $n^{th}$ response result, with respect to each of the numbers included in the n.

The response code transmission unit 830 transmits the response code to the authentication server.

As described above with reference to FIGS. 2 through 8, a method of authenticating a user identifier may be performed by separate authentication servers. As an example, although a plurality of credentials are included in an identical mobile terminal, each of the plurality of credentials may be authenticated by a different Authorization, Authentication and Accounting (AAA) server. In this case, a new authentication protocol, for example, a new Extensible Authentication Protocol (EAP) method, and an extension to an AAA backend protocol, for example, Remote Authentication Dial-In User Service (RADUS), may be utilized.

The PSK-based authentication method according to the above-described exemplary embodiment of the present invention may be recorded in computer-readable media including program instructions to implement various operations embodied by a computer. The media may also comprise, alone or in combination with the program instructions, data files, data structures, and the like. Examples of computer-readable media comprise magnetic media such as hard disks, floppy disks, and magnetic tape, optical media such as CD ROM disks and DVD, magneto-optical media such as optical disks, and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions comprise both machine code, such as produced by a compiler, and files containing higher level code that may be executed by the computer using an interpreter. The described hardware devices may be configured to act as one or more software modules in order to perform the operations of the above-described embodiments of the present invention.

A PSK-based authentication method according to exemplary embodiments of the present invention can process a plurality of authentications via a single procedure and thereby, reduce a latency for an access to a service to the latency for one authentication.

Also, a PSK-based authentication method according to exemplary embodiments of the present invention can utilize an existing authentication protocol while not utilizing a new authentication protocol for the latency.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of performing a multiple Pre-Shared Key (PSK) based authentication, the method comprising:
   generating a combined credential in a terminal using a plurality of credentials, the generated combined credential comprising a combined user identifier including a first user identifier and a second user identifier and a combined PSK including a first PSK and a second PSK corresponding to the first user identifier and the second user identifier, respectively;
   transmitting the generated combined credential from the terminal to an authentication server; and
   authenticating the terminal in the authentication server using the generated combined credential,
   wherein the first user identifier and the first PSK are for a device authentication of the terminal and the second user identifier and the second PSK are for a subscription authentication.

2. The method of claim 1, wherein the combined user identifier and the combined PSK comprise a user identifier and a PSK included in the generated combined credential, respectively in an identical order.

3. The method of claim 1, wherein the generating of the combined PSK is performed when an authentication process of the authentication server has accessed all of PSKs.

4. The method of claim 1, wherein the combined user identifier identifies each user identifier based on a discriminator, the discriminator comprising at least one of '|', '/' and ';'.

5. The method of claim 1, wherein the generating of the combined credential comprises consecutively combining a user identifier, and generating of the combined PSK comprises consecutively combining a PSK.

6. The method of claim 1, wherein the combined user identifier comprises a single string of characters and the combined PSK comprises a single string of characters.

7. A method of performing a Pre-Shared Key (PSK) based authentication in a terminal, the method comprising:
   receiving a challenge code from an authentication server;
   generating a response code based on the challenge code and a plurality of PSKs by converting the challenge code and a first PSK via a predetermined conversion method to generate a first response result, and by converting the first response result and a second PSK via the predetermined conversion method to generate a second response result; and
   transmitting the response code to the authentication server,
   wherein the first PSK is for a device authentication of the terminal and the second PSK is for a subscription authentication, or vice versa.

8. The method of claim 7, wherein the plurality of PSKs is N number of PSKs and the generating of the response code comprises:
converting the challenge code and the first PSK of a first user identifier via the conversion method, and generating the first response result;
converting an n−1$^{th}$ response result and an n$^{th}$ PSK of an n$^{th}$ user identifier via the conversion method, and generating an n$^{th}$ response result; and
generating the n$^{th}$ response result as the response code, when n equals the N,
wherein "n" is an integer.

9. The method of claim 8, wherein the n comprises values between 2 and N, and the method further comprises:
repeating the converting of the n−1$^{th}$ response result and the n$^{th}$ PSK of the n$^{th}$ user identifier via the conversion method, and the generating of the n$^{th}$ response result, with respect to each of the values of the n, until n is equal to N.

10. The method of claim 8, wherein the conversion method comprises a hash function.

11. A method of performing a Pre-Shared Key (PSK) based authentication in an authentication server, the method comprising:
transmitting a challenge code to a terminal;
generating a first response code based on the challenge code and a plurality of PSKs by converting the challenge code and a first PSK via a predetermined conversion method to generate a first response result, and by converting the first response result and a second PSK via the predetermined conversion method to generate a second response result;
receiving a second response code from the terminal;
comparing the first response code and the second response code; and
authenticating the terminal when the first response code is identical to the second response code,
wherein the first PSK is for a device authentication of the terminal and the second PSK is for a subscription authentication, or vice versa.

12. The method of claim 11, wherein the plurality of PSKs is N number of PSKs and the generating of the first response code comprises:
converting the challenge code and the first PSK of a first user identifier via the conversion method and generating the first response result; and
converting an n−1$^{th}$ response result and an n$^{th}$ PSK of an n$^{th}$ user identifier via the conversion method, and generating an n$^{th}$ response result; and
generating the n$^{th}$ response result as the first response code, when n equals the N,
wherein "n" is an integer.

13. The method of claim 12, wherein the n comprises values between 2 and N, and the method further comprises:
repeating the converting of the n−1$^{th}$ response result and the n$^{th}$ PSK of the n$^{th}$ user identifier via the conversion method, and the generating of the n$^{th}$ response result, with respect to each of the values of the n, until n is equal to N.

14. The method of claim 12, wherein the conversion method comprises a hash function.

15. A non-transitory computer-readable storage medium storing a program for implementing a method of performing a Pre-Shared Key (PSK) based authentication method, the method comprising:
generating a combined credential in a terminal using a plurality of credentials, the generated combined credential comprising a combined user identifier including a first user identifier and a second user identifier and a combined PSK including a first PSK and a second PSK corresponding to the first user identifier and the second user identifier, respectively;
transmitting the generated combined credential from the terminal to an authentication server; and
authenticating the terminal in an authentication server using the generated combined credential,
wherein the first user identifier and the first PSK are for a device authentication of the terminal and the second user identifier and the second PSK are for a subscription authentication.

16. A system for performing a multiple Pre-Shared Key (PSK) based authentication, the system comprising:
a generation unit for generating a combined credential in a terminal using a plurality of credentials, the generated combined credential comprising a combined user identifier including a first user identifier and a second user identifier and a combined PSK including a first PSK and a second PSK corresponding to the first user identifier and the second user identifier, respectively;
a transmission unit for transmitting the generated combined credentials from the generation unit to an authentication unit; and
an authentication unit for authenticating the terminal in an authentication server using the generated combined credential,
wherein the first user identifier and the first PSK are for a device authentication of the terminal and the second user identifier and the second PSK are for a subscription authentication.

17. The system of claim 16, wherein the generation unit comprises:
a combined user identifier generation unit for generating the combined user identifier;
a combined PSK generation unit for generating the combined PSK; and
a combined credential generation unit for generating the combined credential comprising the combined user identifier and the combined PSK.

18. The system of claim 17, wherein the combined PSK generation unit generates the combined PSK when an authentication process of the authentication server has accessed all of PSKs.

19. The system of claim 17, wherein the combined user identifier and the combined PSK respectively comprises, in an identical order, a user identifier and a PSK comprised in the combined credential.

20. The system of claim 17, wherein the combined user identifier generation unit is configured to generate the combined user identifier by consecutively combining a user identifier, and the combined PSK generation unit is configured to generate the combined PSK by consecutively combining a PSK.

21. A terminal performing a Pre-Shared Key (PSK) based authentication, the terminal comprising:
a challenge code receiving unit for receiving a challenge code from an authentication server;
a generation unit for generating a response code based on the challenge code and a plurality of PSKs by converting the challenge code and a first PSK via a predetermined conversion method to generate a first response result, and by converting the first response result and a second PSK via the predetermined conversion method to generate a second response result; and a response code transmission unit for transmitting the response code to the authentication server, wherein the first PSK is for a device authentication of the terminal and the second PSK is for a subscription authentication, or vice versa.

22. The terminal of claim 21, wherein the plurality of PSKs is N number of PSKs and the generation unit comprises:

a first response result generation unit for converting the challenge code and the first PSK of a first user identifier via the conversion method, and generating the first response result;

an $n^{th}$ response result generation unit for converting an $n-1^{th}$ response result and an $n^{th}$ PSK of an $n^{th}$ user identifier via the conversion method, and generating an $n^{th}$ response result; and a response code generation unit for generating the $n^{th}$ response result as the response code, when n is identical to the N, wherein "n" is an integer.

23. The terminal of claim 22, wherein the n comprises values between 2 and N, and the terminal further comprises:

a repeating unit for repeating the converting of the $n-1^{th}$ response result and the $n^{th}$ PSK of the $n^{th}$ user identifier via the conversion method, and the generating of the $n^{th}$ response result, with respect to each of the values of the n, until n is equal to N.

* * * * *